(12) United States Patent
Fukagawa et al.

(10) Patent No.: US 7,868,815 B2
(45) Date of Patent: Jan. 11, 2011

(54) WIRELESS DISTANCE MEASUREMENT SYSTEM AND WIRELESS DISTANCE MEASUREMENT METHOD

(75) Inventors: Takashi Fukagawa, Kanagawa (JP); Hirohito Mukai, Tokyo (JP); Yoichi Nakagawa, Tokyo (JP); Tadao Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 83 days.

(21) Appl. No.: 12/486,707

(22) Filed: Jun. 17, 2009

(65) Prior Publication Data

US 2010/0159842 A1 Jun. 24, 2010

(30) Foreign Application Priority Data

Jun. 19, 2008 (JP) ............................. 2008-160444

(51) Int. Cl.
*G01S 13/74* (2006.01)
(52) U.S. Cl. .............................. 342/47; 342/42; 342/30; 455/7
(58) Field of Classification Search .................. 342/15, 342/30, 42–51, 85, 107, 109, 118–146; 455/7–25
See application file for complete search history.

(56) References Cited

U.S. PATENT DOCUMENTS 6,757,054 B2 * 6/2004 Watanabe et al. ............ 356/5.1

2004/0157621 A1 8/2004 Yamasaki

FOREIGN PATENT DOCUMENTS

JP 2004-242122 8/2004

* cited by examiner

*Primary Examiner*—Thomas H Tarcza
*Assistant Examiner*—Timothy A Brainard
(74) *Attorney, Agent, or Firm*—Dickinson Wright PLLC

(57) ABSTRACT

A wireless distance measurement system and a wireless distance measurement method that measure the distance between a base station and a terminal without clock synchronization between a plurality of base stations, and without requiring input of the position relationships between a plurality of base stations. Clock phase shift section (210) shifts a clock that is used to generate transmission pulses is phase-shifted by a specific amount every 100 nanoseconds, and A/D conversion section (211) converts a signal re-radiated from terminal (103) to a digital signal using the shifted clock. Correlation calculation section (212) performs correlation calculation between the digital signal and the transmission pulse and creates a delay profile by adding digital signals in the shifted phases between same phases, and incoming wave detection section (213) detects peaks of the pulses in the delay profile. Distance calculation section (214) calculates the distance to terminal (103) based on the timings to transmit the pulses and the timings to detect peaks of the pulses.

4 Claims, 8 Drawing Sheets

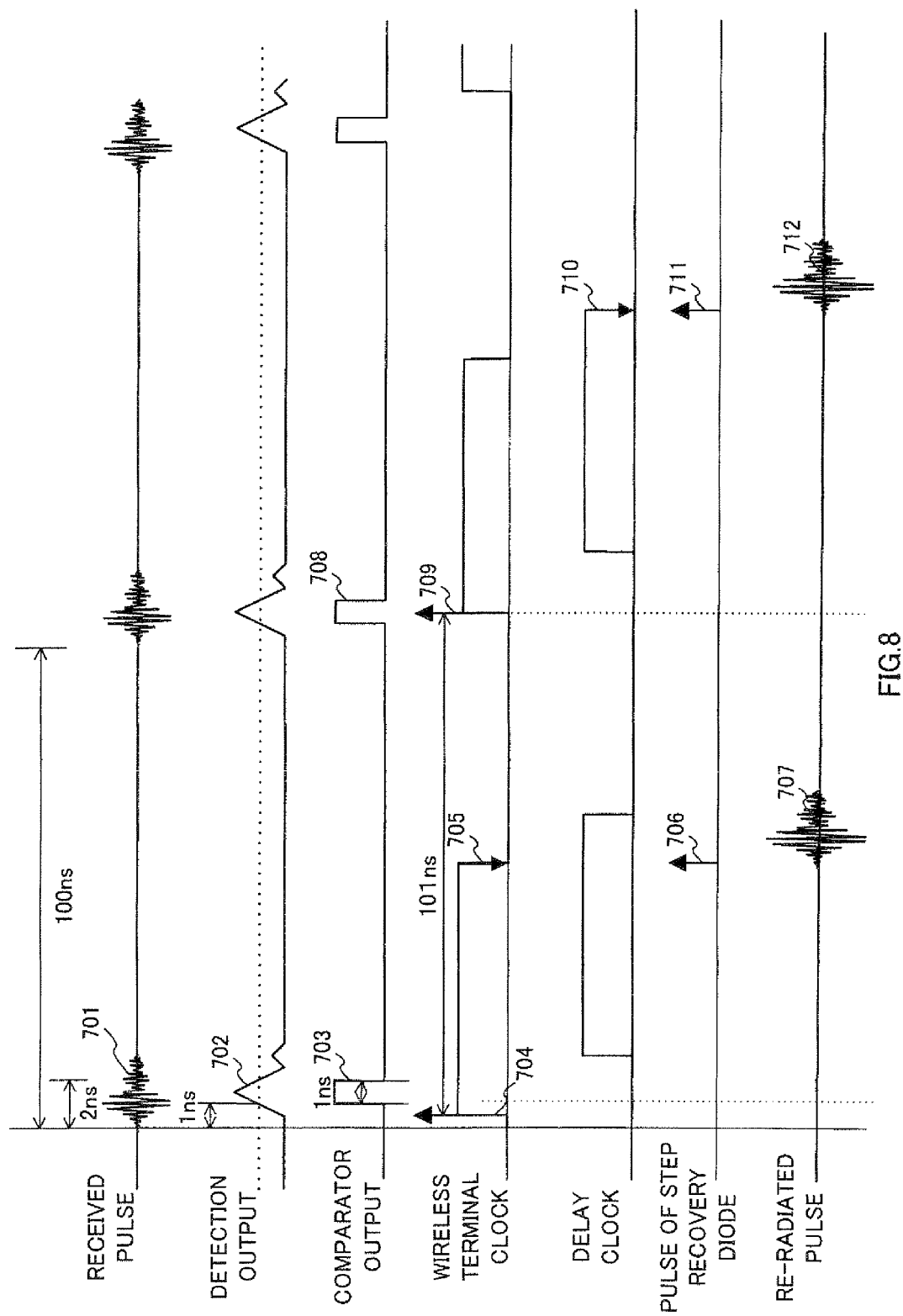

WIRELESS DISTANCE MEASUREMENT SYSTEM AND WIRELESS DISTANCE MEASUREMENT METHOD

CROSS REFERENCE TO RELATED APPLICATIONS

The disclosure of Japanese Patent Application No. 2008-160444, filed on Jun. 19, 2008, including the specification, drawings and abstract, is incorporated herein by reference in its entirety.

BACKGROUND OF THE INVENTION

1. Field of the Invention

The present invention relates to a wireless distance measurement system and a wireless distance measurement method that measure the distance between a wireless communication terminal apparatus and a base station apparatus using UWE (Ultra Wide Band) communication scheme.

2. Description of the Related Art

One of high-speed wireless transmitting techniques includes the UWB communication scheme. The UWB communication scheme is a technique of performing ultrahigh speed wireless communication using a pulse signal sequence formed with a pulse signal synchronized with a timing of a predetermined period. An example of UWB communications is known that communication is carried out using a pulse signal sequence formed with extremely short pulse signals having a pulse width of 1 nanosecond or less without using carrier waves.

Meanwhile, for example, Patent Document 1 discloses a distance measurement technique, in which a base station apparatus (hereinafter "base station") measures the distance to a wireless communication terminal apparatus (hereinafter "terminal"). The distance measurement technique disclosed in Patent Document 1 uses differences between times of arrival of signals received at a terminal using 3 or 4 base stations.

FIG. 1 shows the positioning system disclosed in Patent Document 1. Referring to FIG. 1, the positioning system has a plurality of base stations 11, 12 and 13, and calculation server 14, and, base station 11 to 13 and calculation server 14 are connected by wired network 15. This positioning system is directed to calculating the position coordinate of terminal 10.

In the system disclosed in Patent Document 1, positioning of a terminal is conducted using propagation time differences between measurement signals transmitted and received between the terminal and the base station. To find the absolute time of signal propagation, it is necessary to synchronize the clock of a terminal and the clock of the base station. However, in a general wireless communication system, a terminal and the base station are not synchronized, and therefore it is not possible to conduct positioning (i.e. TOA: Time Of Arrival) using absolute propagation time. However, when a plurality of base station clocks are synchronized, it is possible to find differences of times a measurement signal takes to arrive at the base stations, and it is possible to conduct positioning (i.e. TDOA: Time Difference Of Arrival) using relative propagation time (propagation time difference) Patent Document 1: Japanese Patent Application Laid-Open No. 2004-242122

However, with the positioning system disclosed in above Patent Document 1, the differences between propagation times a measurement signal takes to arrive at a plurality of base stations are used for measurement, and therefore, it is necessary to synchronize the clocks of a plurality of base stations. Consequently, it is necessary to connect the base stations with a cable, or provide a reference station to make clocks to be synchronized besides the base stations for measurement. Further, to measure the distance to a terminal from differences of propagation times for a plurality of base stations, it is necessary to keep the relative position relationships between a plurality of base stations as data, and there is a problem that the positions of the base stations should be measured in advance.

SUMMARY OF THE INVENTION

It is therefore an object of the present invention to provide a wireless distance measurement system and a wireless distance measurement method that can measure the distance between a base station and a terminal without clock synchronization between a plurality of base stations, and without requiring input of the position relationships between a plurality of base stations.

The wireless distance measurement system of the present invention provides a base station apparatus and a wireless communication terminal apparatus, and adopts the configuration of the base station apparatus including: a transmitting section that generates a pulse based on a clock and transmits the generated pulse; a receiving section that receives the transmitted pulse via the wireless communication terminal apparatus; a phase shifting section that shifts a phase of the clock by a specific amount with a regular period; an analog to digital conversion section that converts the received pulse to a digital signal at a plurality of phases using the phase shifted clock; a correlation calculation section that performs correlation calculation between the pulse converted to the digital signal and the pulse as transmitted from the transmitting section, and forms a delay profile by adding correlation values between same phases; a detection section that detects an incoming wave from a desired wireless communication terminal apparatus based on peaks of pulses in the delay profile; and a distance calculation section that calculates a distance to the wireless communication terminal apparatus using an elapsed time after the detected incoming wave is transmitted from the transmitting section until the detected incoming wave is received in the receiving section; and the configuration of the wireless communication terminal apparatus including: a division section that receives the pulse transmitted from the base station apparatus and divides a received signal and a transmission signal; and a first amplification section that amplifies and reradiates the received pulse to the base station apparatus again.

The wireless distance measurement method of the present invention includes steps of: a transmitting step of generating a pulse based on a clock and transmitting the generated pulse from a base station apparatus to a wireless communication terminal apparatus; a reradiating step of reradiating in the wireless communication terminal apparatus the pulse transmitted from the base station apparatus, to the base station apparatus; a receiving step of receiving the re-radiated pulse from the wireless communication terminal apparatus; a phase shifting step of shifting a phase of the clock by a specific amount with a regular period; an analog to digital conversion step of converting the received pulse to a digital signal at a plurality of phases using the phase shifted clock; a correlation calculation step of performing correlation calculation between the pulse converted to the digital signal and the pulse transmitted in the transmitting step, and forming a delay profile by adding correlation values between same phases; a detection step of detecting an incoming wave from a desired wireless communication terminal apparatus based on peaks of the pulses in the delay profile; and a distance calculation step of calculating a distance between the base station apparatus and the wireless communication terminal apparatus using an elapsed time after the detected incoming wave is transmitted in the transmitting step until the detected incoming wave is received in the receiving step.

According to the present invention, it is possible to measure the distance between a base station and a terminal without clock synchronization between a plurality of base stations, and without requiring input of the position relationships between a plurality of base stations.

BRIEF DESCRIPTION OF THE DRAWINGS

FIG. 8 is an illustration provided to explain the operations in the terminal shown in FIG. 8.

DETAILED DESCRIPTION OF THE PREFERRED EMBODIMENT

Figure 1:
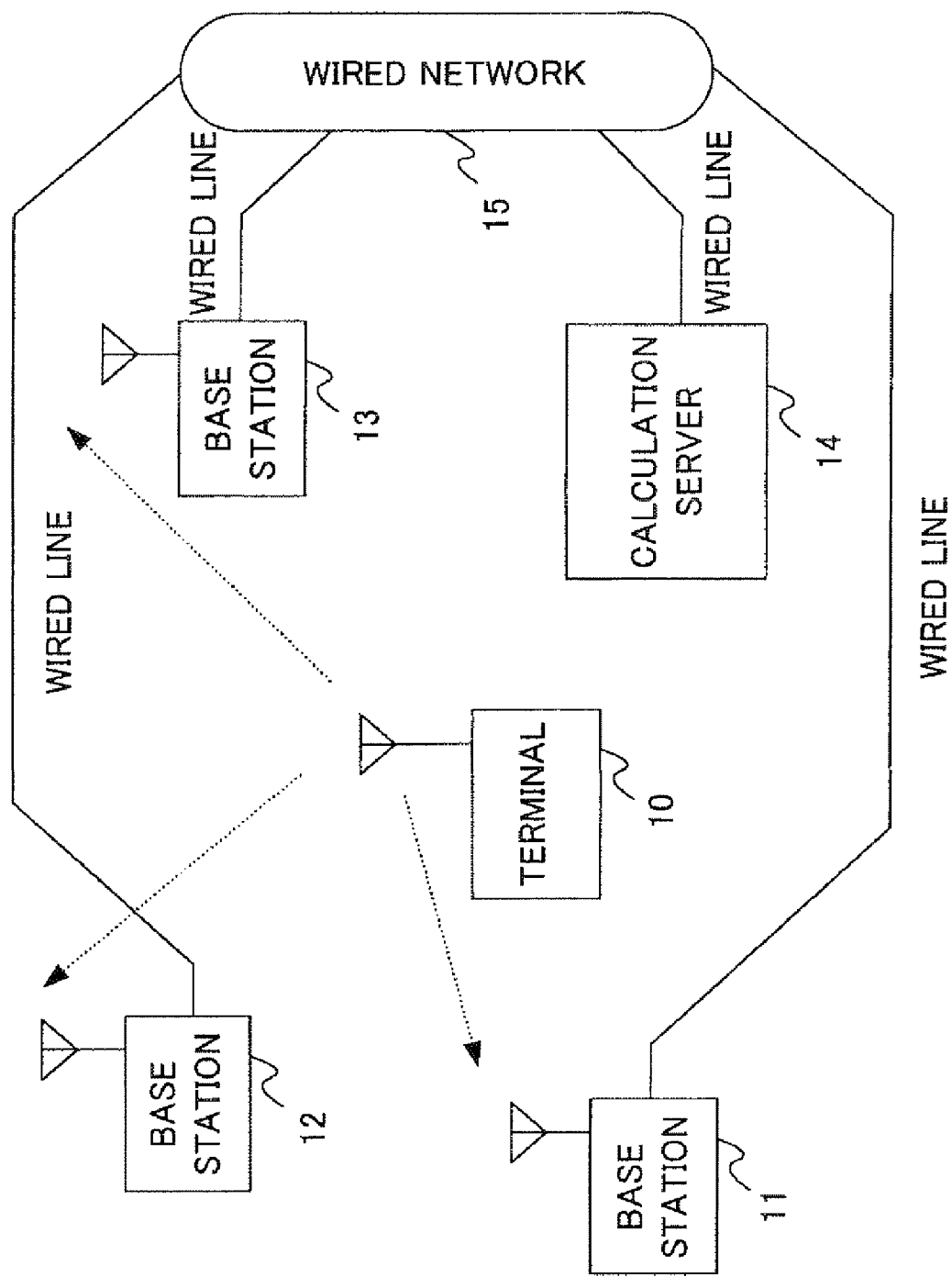
FIG. 1 shows the positioning system disclosed in Patent Document 1.

Now, embodiments of the present invention will be described in detail with reference to the accompanying drawings. Further, in embodiments, the components having the same functions will be assigned the same reference numerals and overlapping descriptions will be omitted.

Embodiment 1

Figure 2:
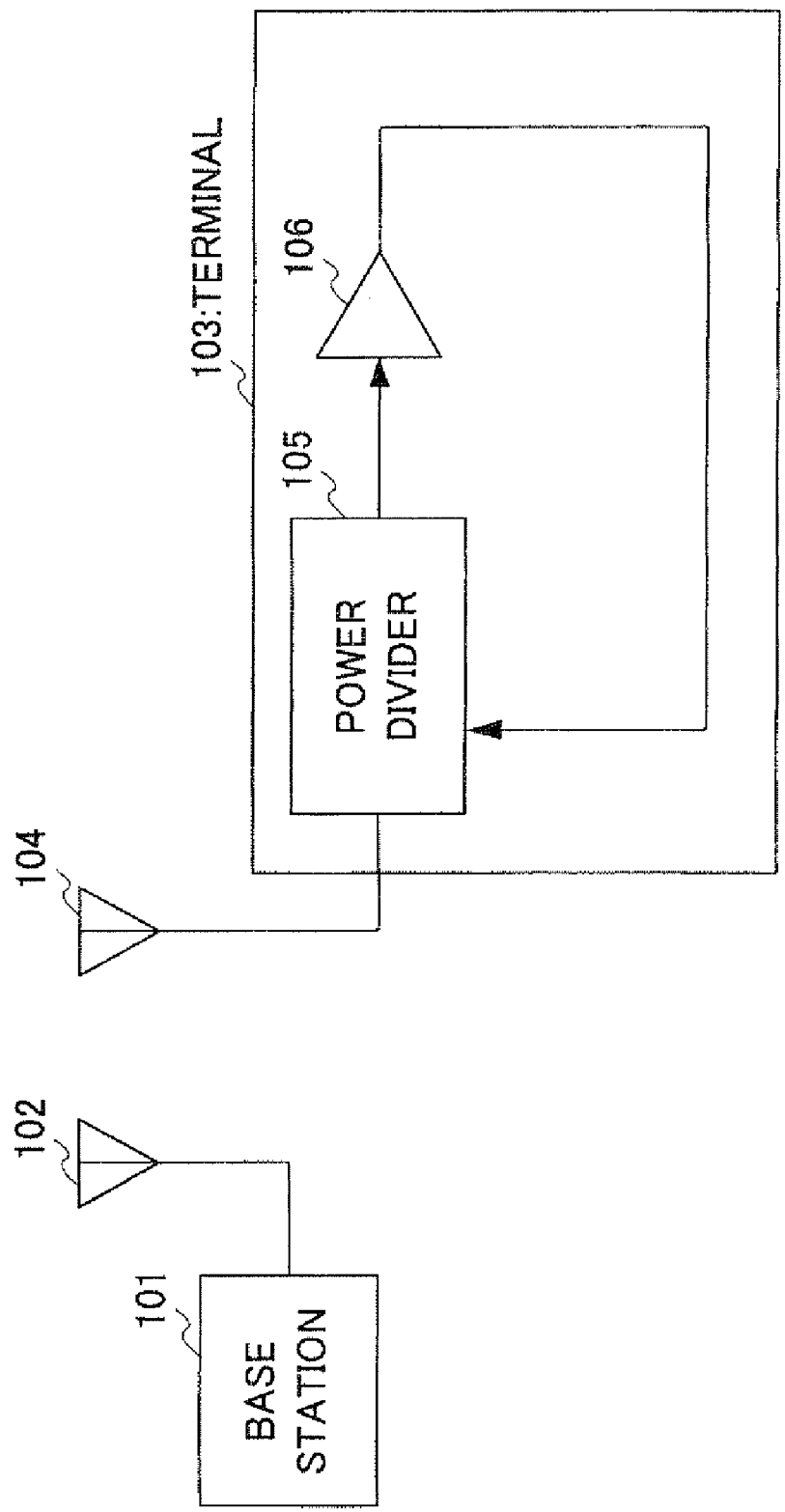
FIG. 2 is a block diagram showing the configuration of the wireless distance measurement system according to Embodiment 1 of the present invention.

FIG. 2 is a block diagram showing the configuration of the wireless distance measurement system according to Embodiment 1 of the present invention. In FIG. 2, base station 101 has antenna 102 and transmits an extremely short pulse signal from antenna 102 by the wireless UWB scheme. According to the wireless UWB scheme, a transmission bandwidth is approximately 1 to 3 GHz, so that extremely short pulses having a pulse width of approximately 1 nanosecond are transmitted. Here, in the case where the pulse width is 1 nanosecond, it is possible to demultiplex signals having propagation delay differences of centimeters or more in space. That is, even when the receiving side receives multi-reflected waves in a multi-path environment, the receiving side can receive and demultiplex multiplexed reflected waves.

Terminal 103, which has antenna 104, power divider 105 and amplifier 106, has the same configuration as a general semi passive wireless tag. A signal transmitted from base station 101 in the UWE band is received by antenna 104.

Power divider 105 outputs the signal received via antenna 104 to amplifier 106. Further, to re-radiate the signal received as input from amplifier 106 (described later) from antenna 104, power divider 105 couples the received signal and the transmission signal and transmits the transmission signal from antenna 104. Further, power divider 105 is configured with parts that can secure sufficient isolation between a transmission signal and received signal and can use, for example, a Wilkinson type coupler or a circulator.

Amplifier 106 amplifies the signal outputted from power divider 105, and returns the amplified signal to power divider 105. However, the level of isolation capable of securing in the UWB band is 20 dB to 30 dB in power divider 105. Consequently, to prevent oscillation inside terminal 103, the amplification factor in amplifier 106 is limited to approximately 20 dB.

Figure 3:
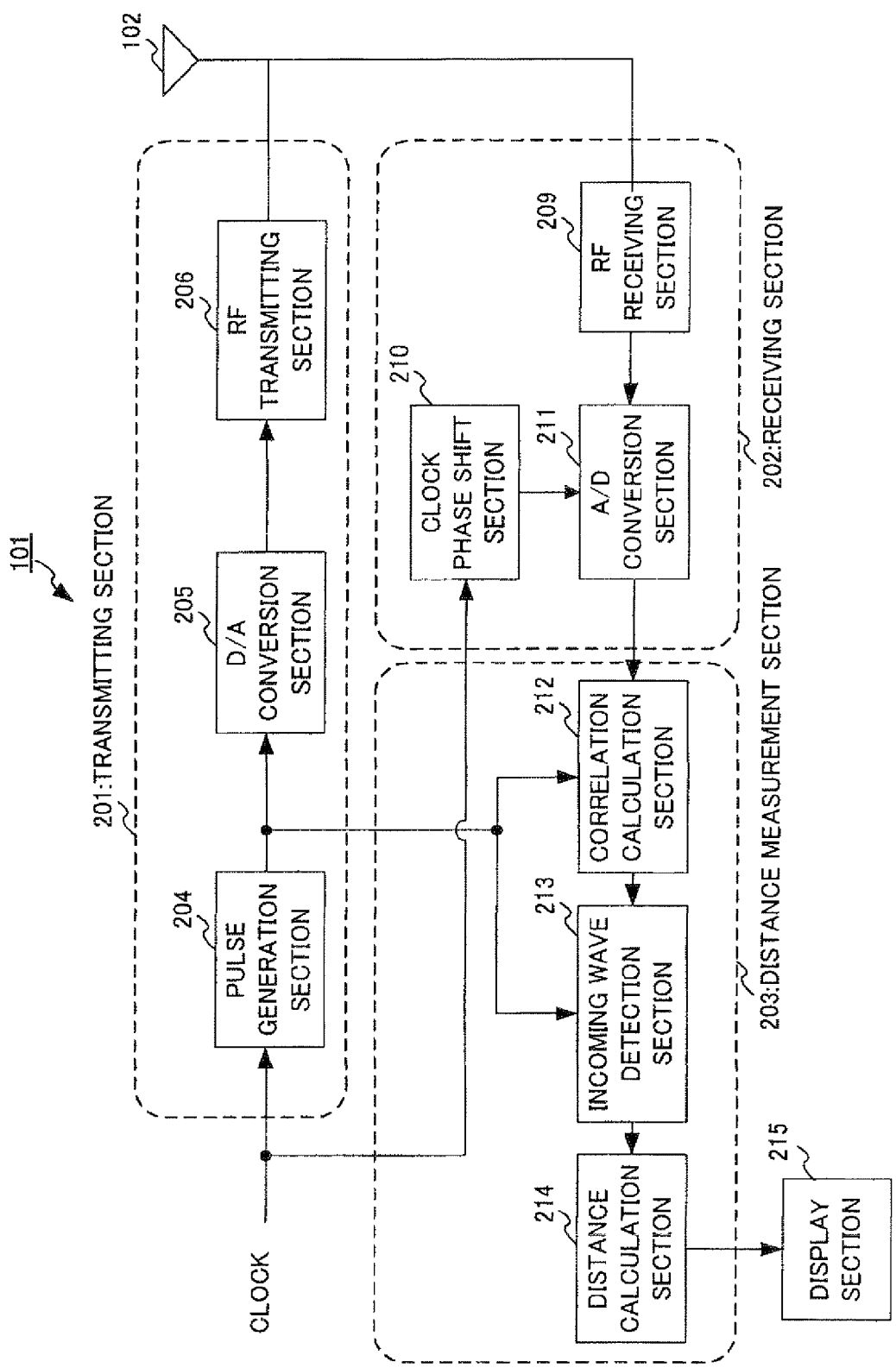
FIG. 3 is a block diagram showing the internal configuration of the base station shown in FIG. 2.

FIG. 3 shows a block diagram showing the internal configuration of base station 101 shown in FIG. 2. Referring to FIG. 3, base station 101 has transmitting section 201, receiving section 202, distance measurement section 203 and display section 215.

Transmitting section 201, which has pulse generation section 204, D/A conversion section 205 and RF transmitting section 206, transmits pulses to terminal 103. Now, the internal configuration of transmitting section 201 will be explained in detail.

Pulse generation section 204 receives the clock as input to decide the pulse width, to generate short pulses at regular intervals. The generated pulses are outputted to D/A conversion section 205, correlation calculation section 212 and incoming wave detection section 213. The pulse width of pulses to be generated is related to the resolution of the distances of incoming waves. For example, if a signal having a pulse width of 1 nanosecond or more is used, it is possible to detect incoming waves having path differences of 30 centimeters or more.

Here, the pulse interval to be generated is determined by considering the coverage of the base station. For example, if the pulse interval is 100 nanoseconds, an electric wave propagates 30 meters in 100 nanoseconds. This means that a base station can receive responses from terminals that are present within a 15 meter radius from the base station, during the period after one pulse is transmitted until the next pulse (i.e. pulse interval) is transmitted.

D/A conversion section 205 converts the pulse signal outputted from pulse generation section 204 into an analog baseband signal, and outputs the converted analog baseband signal to RF transmitting section 206. RF transmitting section 206 performs frequency conversion processing, band limitation processing and amplification processing on the analog baseband signal outputted from D/A conversion section 205, to convert the analog baseband signal to a RF signal, and transmits the RF signal as a UWB pulse signal from antenna 102.

Receiving section 202, which has RF receiving section 209, clock phase shift section 210 and A/D conversion section 211, receives pulses from terminal 103. Now, the internal configuration of receiving section 202 will be explained in detail.

RF receiving section 209 receives, for example, response UWB pulses (i.e. re-radiated pulses) transmitted from terminal 103, reflected waves from reflection objects that exist in space via antenna 102, performs amplification processing, band limitation processing and frequency conversion processing on these received RF signals, to convert the RF signals to a baseband signal, and outputs the baseband signal to A/D conversion section 211.

Clock phase shift section 210 receives the clock as input, and shifts the inputted clock. For example, clock phase shift section 210 shifts the clock by a specific amount of phase every 100 nanoseconds. The shifted clock is outputted to A/D conversion section 211. Clock phase shift section 210 is realized by, for example, a delay line or multi-phase PLL.

A/D conversion section 211 converts the baseband signal outputted from RF receiving section 209 from an analog signal to a digital signal. At this time, A/D conversion section 211 performs A/D conversion using the clock shifted by clock phase shift section 210. The converted digital signal is outputted to correlation calculation section 212.

The specific amount by which the clock is shifted in clock phase shift section 210 is set as follows, for example. When the base station generates a transmission pulse having a width of a 1 nanosecond and uses a 1 GHz clock, the sampling frequency is 1 GHz. However, due to propagation delay time, the sampling points of incoming pulse from terminal 103 is different, and therefore the received levels of the incoming pulse vary. Then, clock phase shift section 210 gives phase fluctuation of approximately one eighth of 1 GHz every 100 nanoseconds, to change the sampling points.

Distance measurement section 203, which has correlation calculation section 212, incoming wave detection section 213 and distance calculation section 214, calculates the distance to terminal 103. Now, the internal configuration of distance measurement section 203 will be explained in detail.

Correlation calculation section 212 performs correlation calculation between the digital signal outputted from A/D conversion section 211 and the pulse sequence outputted from pulse generation section 204, to create a delay profile. Here, the method of correlation calculation includes the sliding correlation method for example. In this method, the pulse sequence transmitted from transmitting section 201 is a replica sequence, and correlation calculation is performed while the phase of the replica sequence is changed. The phase is changed during the period after a pulse is transmitted until the next pulse is transmitted (i.e. pulse interval).

Further, by combining the pulses sampled at the timings clock phase shift section 210 shifts, correlation calculation section 212 increases the power of the received pulses. The created delay profile is outputted to incoming wave detection section 213.

Incoming wave detection section 213 extracts the incoming waves from the delay profile outputted from correlation calculation section 212, calculates the times that have elapsed since the extracted incoming waves were outputted from pulse generation section 204, and outputs the extracted incoming waves and the elapsed times of incoming waves to distance calculation section 214.

By the way, a signal transmitted from the base station is generally attenuated in proportion to the square of the distance due to path loss in free space. However, with the present invention, the terminal re-radiates a signal without demodulation, and therefore a signal is attenuated in proportion to the fourth power of the distance with a round trip, similar to a general passive tag. That is, it is necessary to improve sensitivity in the base station. For example, if the UWB band is 8 GHz and the distance between the base station and the terminal is 10 meters, a signal transmitted from the base station is attenuated by 140 dB with a round trip. For this reason, as described above, 20 dB amplification in a terminal results in 120 dB attenuation as path loss in space.

Here, if the transmission peak power is 3 dBm (decibel milliwatts) and the band is 1 GHz, the received C/N is approximately −50 dB. By this means, correlation calculation section 212 combines delay profiles in which the phase changes every 100 nanoseconds, to create one delay profile. To cite specific values as this processing, for example, correlation calculation section 212 adds delay profiles that are acquired 1 million times every 100 nanoseconds. By this means, in theory, 1 million times is almost equal to the twentieth power of 2, so that 3 (dB)×20 (power)=60 (dB) gain is obtained, and it is possible to measure the distance using the value, which received C/N is improved to approximate 60 dB in approximate 1 second. During the addition of 1 million times, transmitting section 201 and receiving section 202 use the same clock, and therefore synchronization loss due to frequency shift occurs little unlike general communication devices.

Based on the incoming waves and the elapsed times of the incoming waves outputted from incoming wave detection section 213, distance calculation section 214 calculates the distance from base station 101 to terminal 103, and outputs the calculated distance to display section 215. To calculate the distance from base station 101 to terminal 103, the period from the time when a signal from base station 101 is transmitted to the time when the signal in base station 101 is received via terminal 103 is assumed to be the elapsed time, the distance is calculated from the elapsed time of the incoming wave that is a response from the desired terminal. At this time, delay time in D/A conversion section 205 and RF transmitting section 206 after the generation of the pulse and delay time in RF receiving section 209 and A/D conversion section 211 generated upon a response from terminal 103 are subtracted from the elapsed time. These delay times may be held in distance calculation section 214 as pre-calibration data by measuring delay time when the distance is 0 meters. By subtracting the delay times from the elapsed time, it is possible to find accurately the time of arrival after the pulse is transmitted from base station 101 until the pulse is received in terminal 103, and the time of arrival after the response is transmitted from terminal 103 until the response is received in base station 101. Using the two times of arrivals calculated in this way, the distance from base station 101 to terminal 103 is calculated.

Display section 215 shows the distance outputted from distance calculation section 214 on the display.

Figure 4:
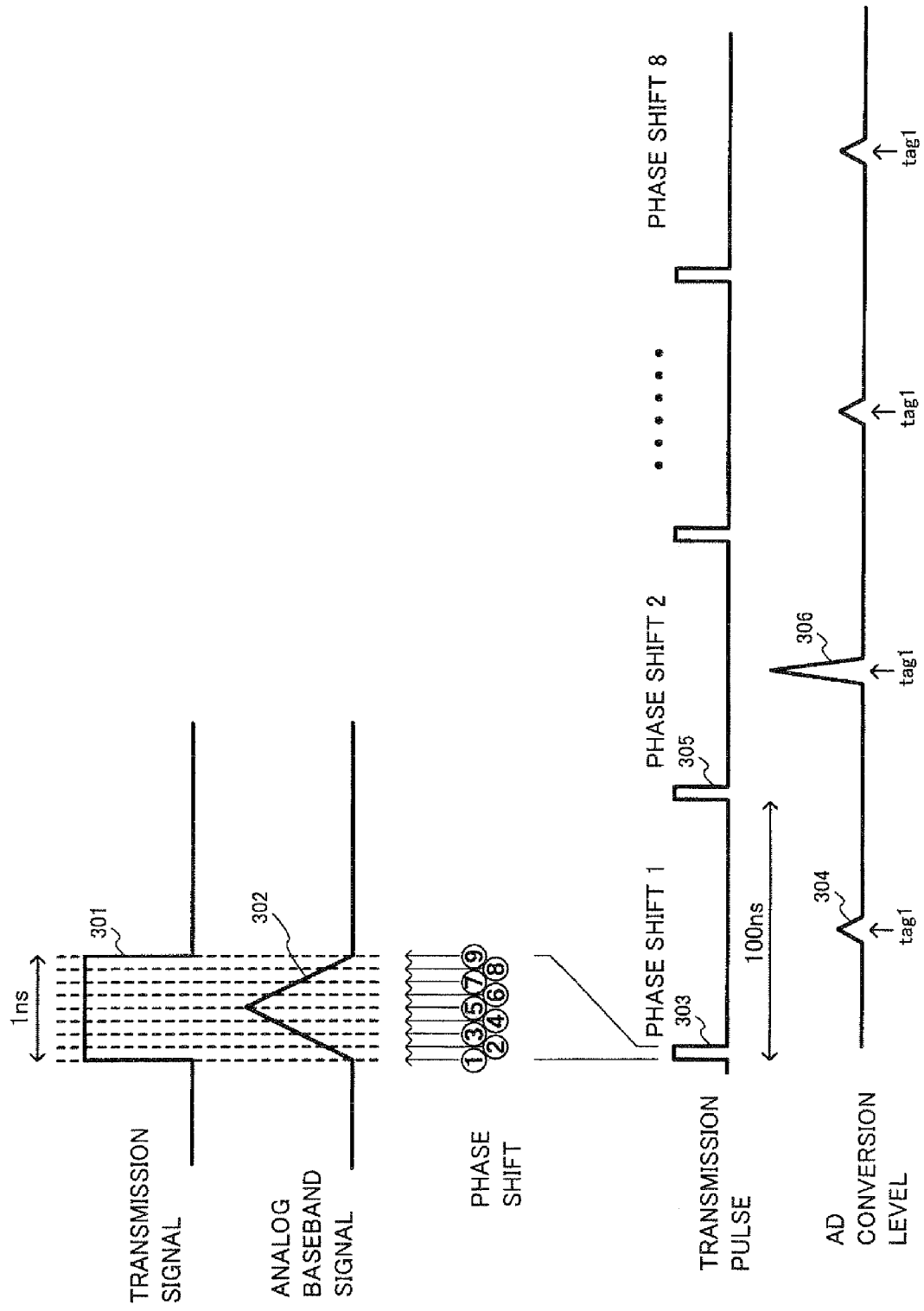
FIG. 4 is an illustration provided to explain the distance measurement steps in the base station shown in FIG. 3.

Next, the steps of distance measurement in base station 101 shown in FIG. 3 will be explained using FIG. 4. In FIG. 4, transmitting signal 301 is a transmission pulse generated as a digital value in pulse generation section 204, or a transmission pulse generated as an analog value in D/A conversion section 205. Further, analog baseband signal 302 is a detected output outputted from RF receiving section 209.

The dotted lines in transmission signal 301 and analog baseband signal 302 show sample timings in the case where the signal is phase-shifted every one eighth of 1 nanosecond. In the actual configuration of the present embodiment, firstly, transmission pulses 303 and 305 are transmitted at 100 nanosecond intervals from transmitting section 201 in base station 101, the space propagation delay and a delay inside terminal 103 are added to these transmission signals, and the signal re-radiated from terminal 103 is detected in RF receiving section 209 in base station 101. Further, in the received signal in base station 101, reflected waves from, for example, walls and reflected waves from other terminals are found, and these received signals are sampled every 100 nanoseconds by shifting the phase of the clock in A/D conversion section 211 by one eighth of 1 nanosecond.

By this means, from the relationship between the propagation delay time and the A/D samples, for example, like propagation pulses 304 and 306 from terminal 103, the A/D conversion level varies even in the same received signal because their sampling phases vary. Pulses are sampled at 8 phases and the sampled pulses are combined between the same phases, so that it is possible to detect peaks in reflected waves. Consequently, it is possible to remove unnecessary reflected waves and extract only signals from the desired terminal, so that it is possible to find accurately the time of arrival after a pulse is transmitted from the base station until the pulse is received in the terminal, and the time of arrival after a response is transmitted from the terminal until the response is received in the base station. The distance from the base station to the terminal is calculated using the two periods of arrival calculated in this way.

In this way, according to Embodiment 1, a clock that is used to generate transmission pulses is phase-shifted by a specific amount at regular intervals, and signals re-radiated from a terminal are converted to digital signals using the shifted clock. Then, the correlations between these digital signals and transmission pulses are calculated, and peaks of the pulses acquired by adding digital signals in the shifted phases between the same phases are detected. Further, based on the timings the pulses are transmitted and the timings the peaks of the pulses are detected, the base station calculates the distance to the terminal. In this way, according to Embodiment 1, the distance to the terminal can be used only one base station, and therefore a plurality of base stations do not need to cooperate, and it is possible that clock synchronization and position relationships between base stations are no longer necessary.

Embodiment 2

Figure 5:
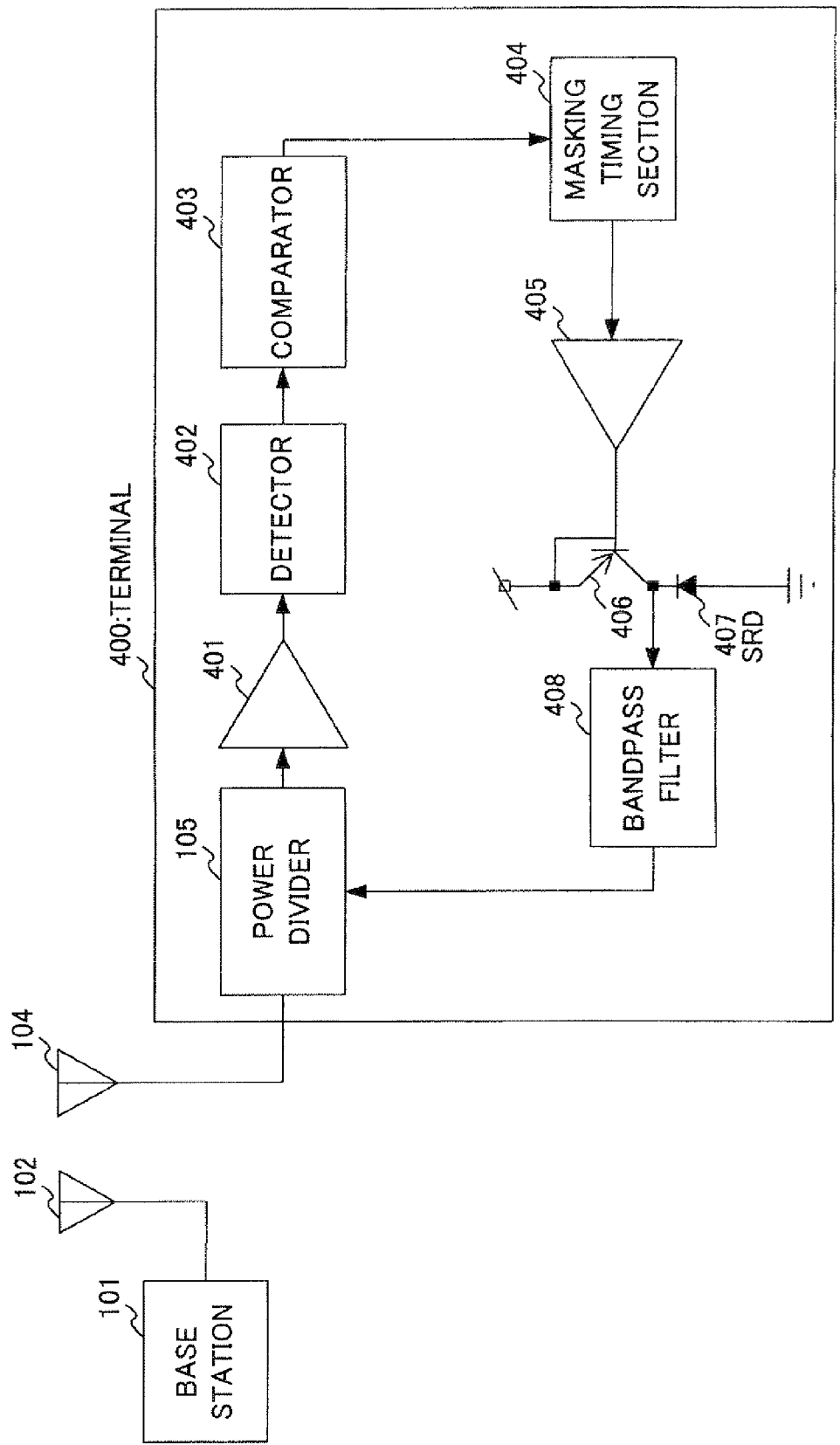
FIG. 5 is a block diagram showing the configuration of the wireless distance measurement system according to Embodiment 2 of the present invention.

FIG. 5 is a block diagram showing the configuration of wireless distance measurement system according to Embodiment 2 of the present invention. In FIG. 5, terminal 400 has power divider 105, amplifier 401, detector 402, comparator 403, masking timing section 404, buffer amplifier 405, voltage-to-current conversion section 406, step recovery diode (SRD) 407 and bandpass filter 408. Now, the internal configuration of the terminal different from FIG. 2 will be explained in detail.

Amplifier 401 amplifies a signal outputted from power divider 105 and outputs the amplified signal to detector 402. The amplification factor in amplifier 401 is large enough to operate detector 402 and comparator 403 (described later).

Detector 402 performs envelope detection on the signal outputted from amplifier 401 by, for example, a diode, and outputs the detected signal to comparator 403. Comparator 403 digitizes the signal outputted from detector 402 into a binary value, generates a pulse generating timing transmitted from terminal 400 and outputs the digitized binary signal to masking timing section 404.

Masking timing section 404 masks the signal outputted from comparator 403 at a predetermined timing, and the masked signal is not outputted from masking timing section 404. At timings other than the masking timing, masking timing section 404 outputs the signal outputted from comparator 403 to buffer amplifier 405.

Buffer amplifier 405 amplifies the signal outputted from masking timing section 404 and outputs the amplified signal to voltage-to-current conversion section 406, and voltage-to-current conversion section 406 converts the signal outputted from buffer amplifier 405 into a current in proportion to the voltage, and outputs the converted current to bandpass filter 408 via step recovery diode 407. Further, when the signal outputted from buffer amplifier 405 is the trailing edge, the current outputted from voltage-to-current conversion section 406 passes through step recovery diode 407, so that an impulse is generated and the generated impulse is outputted to bandpass filter 408.

Bandpass filter 408 limits the band of the impulse generated in step recovery diode 407 so as to satisfy a UWB spectral mask, and, transmits the band-limited impulse, that is, a UWB pulse, to base station 101 via power divider 105 and antenna 104.

The signal transmitted from terminal 400 is received in base station 101, and base station 101 measures the distance to terminal 400 according to the steps of distance measurement shown in Embodiment 1.

Here, the isolation in power divider 105 is approximately 20 to 30 dB as shown in Embodiment 1. Accordingly, for example, if a UWB pulse of −10 dBm is given, a signal of approximately −30 to −40 dBm is outputted from power divider 105 to amplifier 401. This signal has significant power compared to the received power. For this reason, if the UWB pulse generated in terminal 400 intrudes upon the receiving side, loop processing is repeated and pulses are in a state of continuous transmission. Masking timing section 404 is provided to prevent this repeating loop processing. Examples of masking timing section 404 are, for example, a D flip-flop that toggles at the trailing edge of a pulse.

Figure 6:
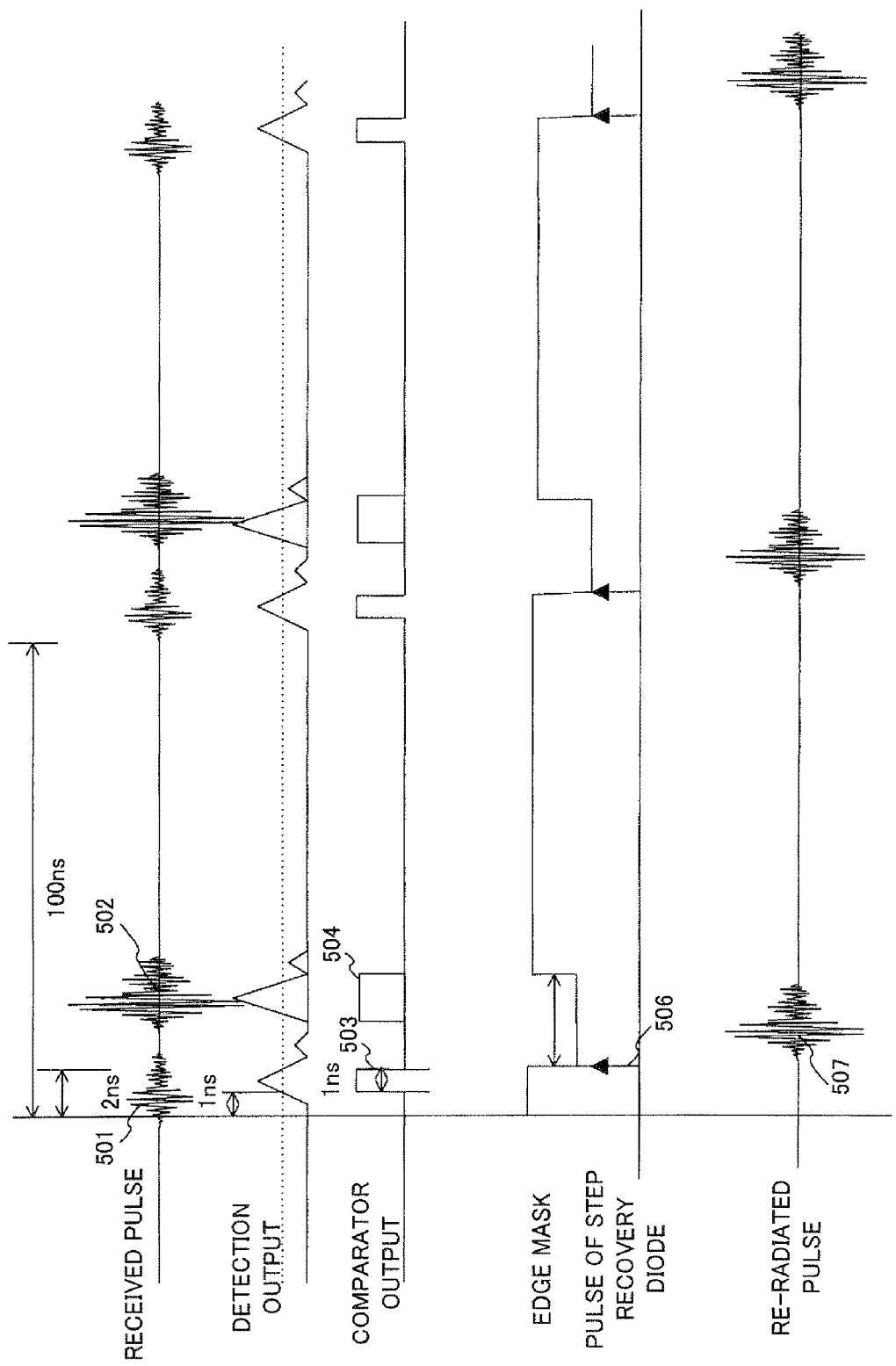
FIG. 6 is an illustration provided to explain the operations in the terminal shown in FIG. 5.

Next, the operations of terminal 400 shown in FIG. 5 will be explained using FIG. 6. Received pulse 501 is detected in detector 402 and the detected result is digitized into a binary value in comparator 403. An impulse is generated from binary comparator output 503 in step recovery diode 407 at trailing edge 506 through masking timing section 404, buffer amplifier 405, voltage-to-current conversion section 406 and step recovery diode 407.

The impulse generated in step recovery diode 407 is subject to band limitation in bandpass filter 408 and transmitted as re-radiated pulse 507. Re-radiated pulse 507 is transmitted from antenna 104 to air, and, meanwhile, intrudes upon the receiving side, and is received as input to amplifier 401 again as UWE pulse 502 of a leaked signal in power divider 105.

Then, trailing edge 506 of comparator output 503 is received as input to the clock input in masking timing section 404, so that comparator output 504 of UWB pulse 502, which is a leaked signal, is masked by masking timing section 404, and the trailing edge of comparator output 504 is not outputted from masking timing section 404. Although the comparator output is received as input a reset signal of masking timing section 404, the comparator output is masked as a digital signal while UWB pulse 502 of a leaked signal is inputted, and therefore, the leaked signal does not oscillate again.

In this way, according to Embodiment 2, even if the transmission signal of the terminal leaks to the receiving side in the power divider, by masking the edge signals of the leaked signal, it is possible to prevent the leaked signal from oscillating again.

Embodiment 3

Figure 7:
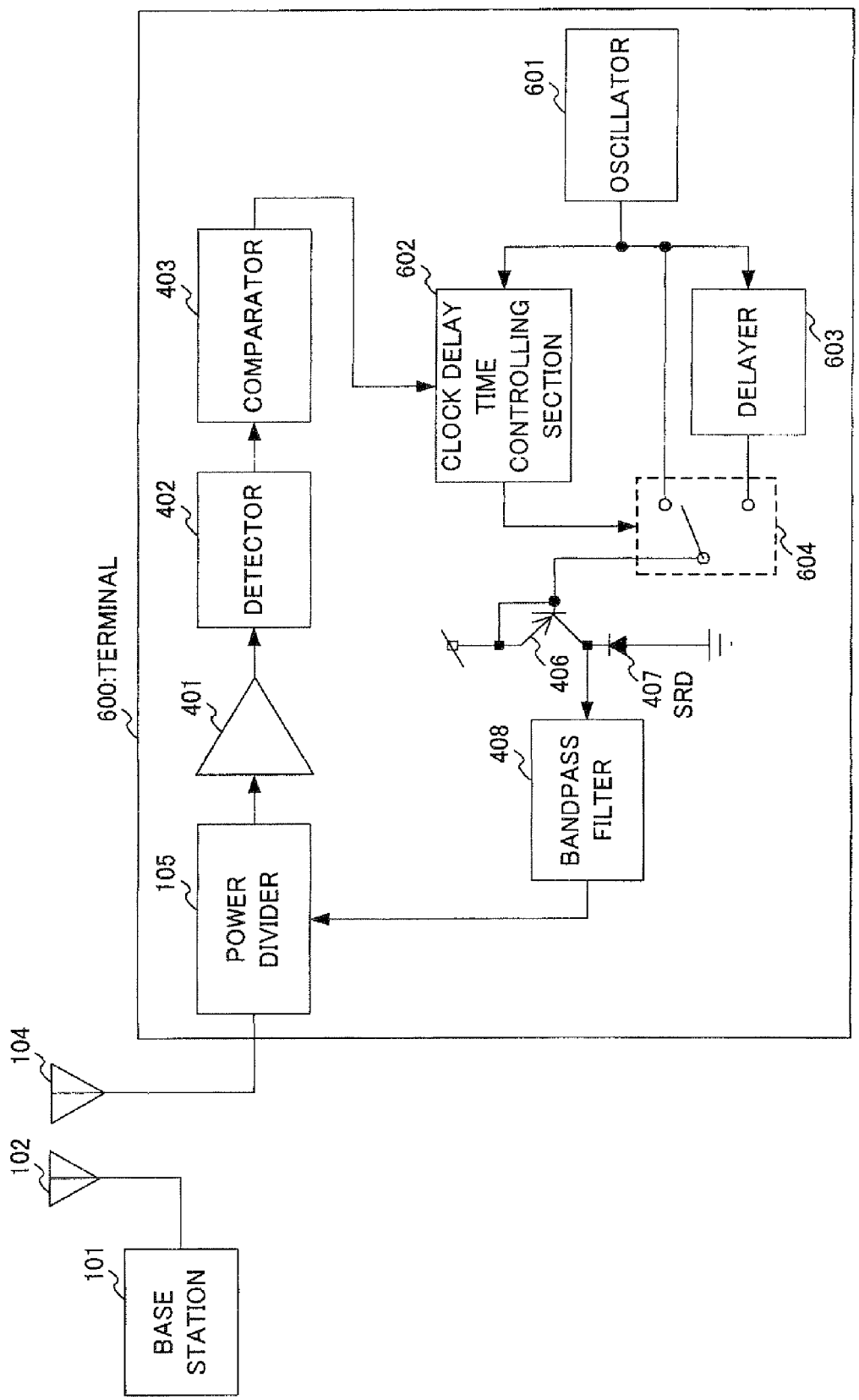
FIG. 7 is a block diagram showing the configuration of the wireless distance measurement system according to Embodiment 3 of the present invention.

FIG. 7 is a block diagram showing the configuration of wireless distance measurement system according to Embodiment 3 of the present invention. In FIG. 7, terminal 600 has power divider 105, amplifier 401, detector 402, comparator 403, oscillator 601, clock delay time controlling section 602, delayer 603, clock switch 604, voltage-to-current conversion section 406, step recovery diode (SRD) 407 and bandpass filter 408. Now, internal configuration of terminal 600 that is different in FIG. 5 will be explained in detail.

Oscillator 601 generates a square wave signal in a frequency approximately 1% different from the transmission clock rate of base station 101. Here, base station 101 transmits UWB pulses at 100 nanosecond intervals, so that the transmission clock rate in base station 101 is 10 MHz, and, in contrast, oscillator 601 oscillates at 9.9 MHz. The generated square wave is outputted to clock delay time controlling section 602, delayer 603 and one terminal of clock switch 604.

Clock delay time controlling section 602 uses a D flip-flop, and, if a detection output is acquired in comparator 403, a "1" signal is outputted from comparator 403, and, if a detection output is not acquired in comparator 403, a "0" signal is outputted from comparator 403. Meanwhile, the trigger terminal of the D flip-flop latches the comparator output at the rising edge of the clock, so that clock delay time controlling section 602 decides whether a UWB detection signal is acquired at the rising edge of the clock signal outputted from oscillator 601. Based on this decision result, clock delay time controlling section 602 controls clock switch 604.

Delayer 603 selects a value that is smaller than the period of the clock oscillating in oscillator 601 and that is larger than the UWB pulse width with the present embodiment, the clock period in oscillator 601 is 101 nanoseconds and the UWB pulse is 1 nanosecond, and therefore, in delayer 603, a value is set up between 2 and 10 nanoseconds. This delayed clock is outputted to the other terminal of clock switch 604.

When a "1" signal is outputted from the D flip-flop in clock delay time controlling section 602, that is, when a detection output is acquired in comparator 403, clock switch 604 outputs the clock with a delay outputted from delayer 603, to voltage-to-current conversion section 406. On the other hand, when a "0" signal is outputted from the D flip-flop in clock delay time controlling section 602, that is, when a detection output is not acquired in comparator 403, clock switch 604 outputs the clock without delay outputted from oscillator 601, to voltage-to-current conversion section 406.

Next, the operations of terminal 600 shown in FIG. 7 will be explained using FIG. 8. Received pulse 701 is detected in detector 402 and detection output 702 having a pulse width of approximately 1 nanosecond is acquired. Detection output 702 is digitized into a binary value in comparator 403 and binary comparator outputs 703 and 708 are acquired.

Here, terminal 600 having oscillator 601, which oscillates in a frequency approximately 1% different from base station 101, operates based on that frequency. For example, when base station 101 transmits UWE pulses at 100 nanosecond intervals, the repetition cycle is 10 MHz, and therefore oscillation frequency is set up at 9.9 MHz in oscillator 601 in terminal 600. In this case, it is not particularly necessary to synchronize base station 101 and terminal 600, and the frequency difference between base station 101 and oscillator 601 in terminal 600 may only be sufficiently small with respect to the frequency difference between base station 101 and terminal 600.

Rising edges 704 and 709 and trailing edge 705 are the edges at which delay is not added to the oscillator output. The comparator output is latched in the D flip-flop at the timings of rising edges 704 and 709, so that, as for comparator output 703, the trailing edge of the clock outputted from clock switch 604 is trailing edge 705 of the clock without delay, and, as for comparator output 708, the trailing edge of the clock outputted from clock switch 604 is trailing edge 710 of the clock to which a delay is added.

As a result, an impulse in step recovery diode 407 is made impulses 706 and 711 corresponding to trailing edges 705 and 710, and impulses 706 and 711 are transmitted as re-radiated pulses 707 and 712 after passing bandpass filter 408.

In this way, when the detection output of a received pulse and the rising edge of the clock of a terminal match, delay time is given to the timings to transmit re-radiated pulses. That is, these re-radiated pulses are transmitted as UWE pulses subjected to pulse position modulation. On the other hand, when the detection output of a received pulse and the rising edge of the clock of a terminal do not match, delay time is not given to the timings to transmit re-radiated pulses.

In the present embodiment, the interval between the received pulses is 100 nanoseconds, and the frequency difference between the interval between the received pulses and the clock of terminal 600 is 1 nanosecond. For this reason, the timing of received pulses and the timing of the clock of terminal 600 match at a rate of once every 100 times, and the re-radiated pulses with a delay time are transmitted from terminal 600.

The UWB pulse transmitted from terminal 600 is received in antenna 102 in base station 101 and base station 101 measures the distance to terminal 600 according to the steps of distance measurement shown in Embodiment 1. As described above, terminal 600 transmits 99 pulses out of 100 pulses at 101 nanosecond intervals and transmits 1 pulse at an addition of delay time to 101 nanoseconds, so that, by detecting these 101 nanosecond intervals and by averaging the 99 pulses, base station 101 can synchronize with terminal 600 at the base station side.

On the other hand, the UWB pulses transmitted from terminal 600 at an addition of a delay time to 101 nanosecond include a delay time that is added in terminal 600 to the reference clock in base station 101 (here, 10 MHz), and a round trip time of a radio wave between base station 101 and terminal 600. Therefore, by subtracting the delay time known to terminal 600 from the UWB pulses transmitted at an addition of a delay time, it is possible to detect a round trip time and find the distance between base station 101 and terminal 600.

In this way, according to Embodiment 3, the clock of the terminal is set lower than in a frequency the clock of the base station, and, when a detection output of a received pulse and the rising edge of the clock of the terminal match, a delay time is given to re-radiated pulses, and, when a detection output of a received pulse and the rising edge of the clock in the terminal do not match, a delay time is not given to re-radiated pulses. Then, by detecting pulses without a delay time and averaging the detected pulses, the base station can synchronize with the terminal. Further, the base station can calculate the distance to the terminal using the pulses with a delay time.

Although cases have been explained with the embodiments above where the amplification factor of the amplifier is 20 dB, the present invention is not limited to this.

Further, the base station described with the embodiments may be, for example, a "reader/writer," and the terminal may be referred to as a "wireless tag." To be more specific, the present invention may be implemented to measure the positions of wireless tags mounted in a remote controller and name tag. Further, the present invention is applicable to, for example, accurate distance measurement between objects.

What is claimed is:

1. A wireless distance measurement system having a base station apparatus and a wireless communication terminal apparatus, the base station apparatus comprising:
   a transmitting section that generates a pulse based on a clock and transmits the generated pulse;
   a receiving section that receives the transmitted pulse via the wireless communication terminal apparatus;
   a phase shifting section that shifts a phase of the clock by a specific amount with a regular period;
   an analog to digital conversion section that converts the received pulse to a digital signal at a plurality of phases using the phase shifted clock;
   a correlation calculation section that performs correlation calculation between the pulse converted to the digital signal and the pulse as transmitted from the transmitting section, and forms a delay profile by adding correlation values between same phases;

a detection section that detects an incoming wave from a desired wireless communication terminal apparatus based on peaks of pulses in the delay profile; and a distance calculation section that calculates a distance to the wireless communication terminal apparatus using an elapsed time after the detected incoming wave is transmitted from the transmitting section until the detected incoming wave is received in the receiving section; and the wireless communication terminal apparatus comprising:

a division section that receives the pulse transmitted from the base station apparatus and divides a received signal and a transmission signal; and a first amplification section that amplifies and reradiates the received pulse to the base station apparatus again.

2. The wireless distance measurement system according to claim 1, wherein:

the wireless communication terminal apparatus further comprises:

a detection section that performs envelope detection on the received pulse amplified in the first amplification section;

a comparator that digitizes a detection result into binary in the detection section;

a mask section that masks a leaked signal, which is the transmission signal intruded in the division section, in the binary signal;

a second amplification section that amplifies a signal having passed the mask section;

a voltage-to-current conversion section that converts the signal that has been amplified in the second amplification section;

a diode that generates an impulse from a signal at an edge of the binary signal and that is subject to the voltage-to-current conversion; and a bandpass filter that limits a band of the generated impulse and radiates the generated impulse again subject to the band limitation to the base station apparatus.

3. The wireless distance measurement system according to claim 1, wherein:

the wireless communication terminal apparatus further comprises:

a detection section that performs envelope detection on the received pulse amplified in the first amplification section;

a comparator that digitizes a detection result into binary in the detection section;

an oscillation section that generates a clock in a frequency different from said clock in the base station apparatus;

a delay section that delays the clock generated in the oscillation section;

a switching section that switches to output the delayed clock when a detection output is acquired in the detection section, and to output the clock generated in the oscillation section when the detection output is not acquired by the detection section;

a voltage-to-current conversion section that performs a voltage-to-current conversion of the signal outputted from the switching section;

a diode that generates an impulse from a signal at an edge of the binary signal and that is subject to the voltage-to-current conversion; and a bandpass filter that limits a band of the generated impulse and radiates again the generated impulse subject to the band limitation to the base station apparatus.

4. A wireless distance measurement method comprising:

a transmitting step of generating a pulse based on a clock and transmitting the generated pulse from a base station apparatus to a wireless communication terminal apparatus;

a reradiating step of reradiating in the wireless communication terminal apparatus the pulse transmitted from the base station apparatus, to the base station apparatus;

a receiving step of receiving the re-radiated pulse from the wireless communication terminal apparatus;

a phase shifting step of shifting a phase of the clock by a specific amount with a regular period;

an analog to digital conversion step of converting the received pulse to a digital signal at a plurality of phases using the phase shifted clock;

a correlation calculation step of performing correlation calculation between the pulse converted to the digital signal and the pulse transmitted in the transmitting step, and forming a delay profile by adding correlation values between same phases;

a detection step of detecting an incoming wave from a desired wireless communication terminal apparatus based on peaks of the pulses in the delay profile; and a distance calculation step of calculating a distance between the base station apparatus and the wireless communication terminal apparatus using an elapsed time after the detected incoming wave is transmitted in the transmitting step until the detected incoming wave is received in the receiving step.

\* \* \* \* \*